Oct. 4, 1932.　　　　　D. J. CURNEY　　　　　1,880,838
SAND TRAP FOR PROTECTION OF SHORES, BEACHES, ETC
Filed April 9, 1931　　　2 Sheets-Sheet 2

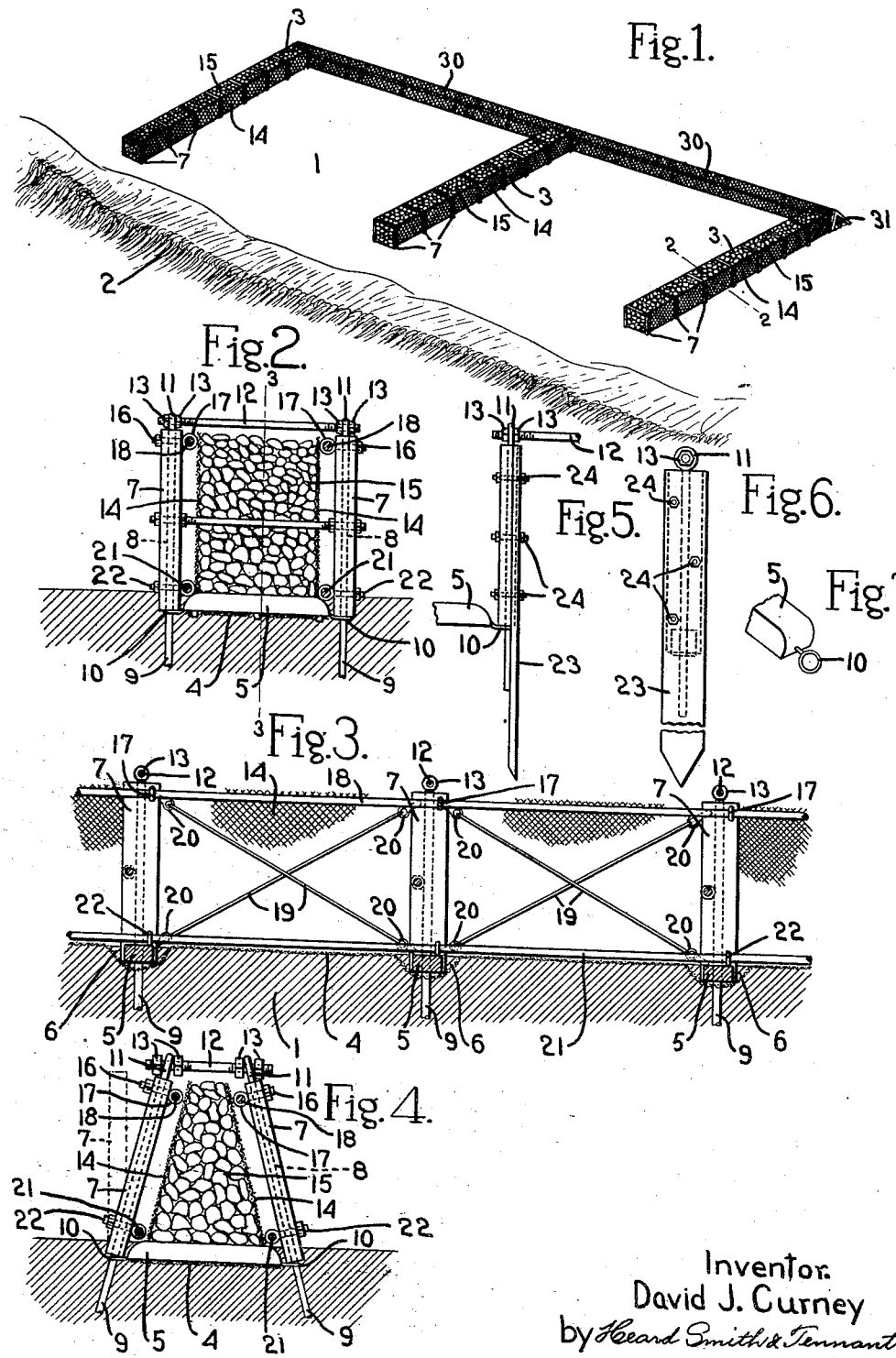

Inventor.
David J. Curney
by Heard Smith & Tennant
Attys.

Patented Oct. 4, 1932

1,880,838

UNITED STATES PATENT OFFICE

DAVID J. CURNEY, OF VINEYARD HAVEN, MASSACHUSETTS

SAND TRAP FOR PROTECTION OF SHORES, BEACHES, ETC.

Application filed April 9, 1931. Serial No. 528,741.

This invention relates to a novel sand trap which is designed to be used for protecting shore property and to prevent the erosion of beaches by the action of the waves.

My improved sand trap is of such a construction that it can be easily built at a relatively small expense and when installed it serves to catch and hold the seaweed and thus form a foundation for building up the shore line and preventing erosion thereof by the waves.

In order to give an understanding of the invention I have illustrated in the drawings a selected embodiment thereof which will now be described after which the novel features will be pointed out in the appended claims.

Fig. 1 is a general perspective view illustrating the manner of installing my improved sand trap;

Fig. 2 is an enlarged vertical section through a sand trap on substantially the line 2—2, Fig. 1;

Fig. 3 is a section on the line 3—3, Fig. 2 but with the ballast omitted;

Fig. 4 is a view similar to Fig. 2 showing a different manner of installing the sand trap;

Figs. 5 and 6 are views showing a different embodiment of the invention.

Fig. 7 is a fragmentary perspective view of the end of one of the sills;

Figure 8:
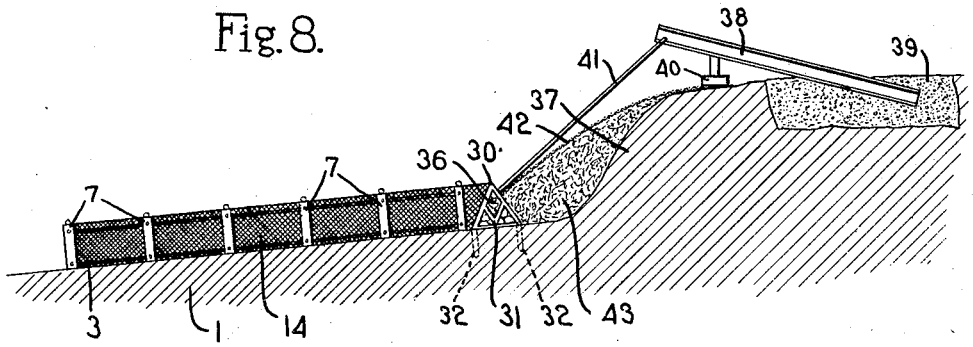
Fig. 8 is a side view and Fig. 9 a front view of a different embodiment of the invention.
Figure 9:
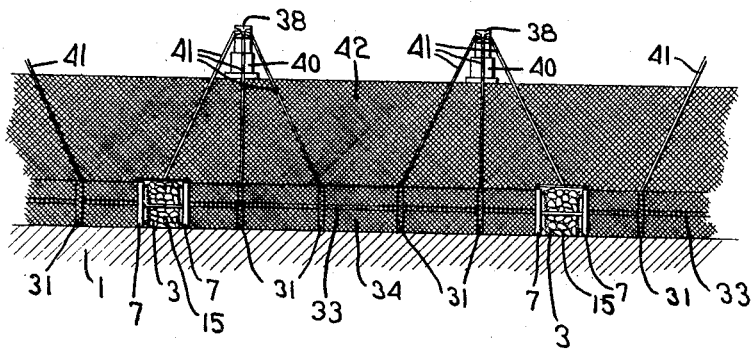

In the drawings 1 indicates a shore line or beach property which it is desired to protect and 2 indicates a portion of the adjacent ocean or water.

My improved sand trap comprises one or more walls of special construction which are built on the beach 1, preferably at about right angles to the shore line, and a connecting trap section which connects the walls at their ends away from the water. These walls and the trap section serve to catch the seaweed and other material and act as a trap for the sand so that the beach will be gradually built up rather than washed away by the action of the waves.

In Fig. 1 I have shown three walls, indicated at 3, which extend at substantially right angles to the shore line and have shown two trap sections 30 connecting these walls. The number of walls 3 and trap sections will, of course, vary with conditions to be met with at the shore.

Each of these walls 3 is formed as follows. On the sand beach is laid a wire matting 4 which is of the length and width of the wall to be built. Placed on this wire matting at suitable intervals are cross sills 5 which may conveniently be of cement. I will preferably scoop out the sand 1 at the place where the sills 5 are to be placed so that each sill will be placed in a hollow 6 in the sand as shown in Fig. 3. The wire matting 4 will preferably be bent into these hollows 6 beneath the sills.

Associated with each end of each sill is an upright or post 7 which may be of wood or concrete or any suitable material. Each post is shown as having a rod 8 extending longitudinally therethrough from the top to the bottom and these rods 8 project a distance below the posts as shown at 9.

Each sill is provided at each end thereof with an eye 10 through which the projecting end 9 of a rod 8 extends. Where the sills 5 are made of concrete these eyes 10 may be made of wire, the wire being embedded in the cement sill and projecting beyond the ends thereof to form the eye.

The rods 8 project above the posts 7 and the upper ends of the rods are provided with eyes 11. The two posts at the ends of any sill 5 are connected together by a suitable tie rod 12 which extends through the eyes 11, the tie rod having check nuts 13 thereon which can be tightened up against the eyes thereby to lock the tie rod to the posts.

Situated inside of the posts are lengths of wire mesh 14 which are set on edge and which form between them a channel or space to receive ballast 15 in the form of stones or any other suitable material.

Each post is preferably provided at its top with an eye bolt 16 which extends therethrough with the eye 17 on the inside of the post and rods 18 extend through the eyes 17 and thus form a support for the upper edge of the vertically-arranged wire mesh elements 14.

If desired, the adjacent posts may be braced or connected together by suitable cross bracing 19. This cross bracing is shown in the form of wire or rods which are connected at their ends to eye bolts 20 anchored in the posts. If desired, I may also employ a rod 21 which extends the length of the wall adjacent the bottom of each post, the rod 21 being carried in eye bolts 22 that are anchored in the posts.

In Fig. 2 the wall is shown as having parallel sides. Under some circumstances better results may be obtained by making one or both of the side walls somewhat inclined instead of perpendicular. In Fig. 4, for instance, an installation is illustrated in which the posts at both sides of the wall are set at a slight inclination so that they taper toward each other at the top. In this case shorter tie bolts 12 can be used at the top than is illustrated in Fig. 2.

Or, if desired, the posts on one side of the wall may be vertical as shown by the dotted line Fig. 4 and the posts on the other side more or less inclined. The particular angle which these posts will assume will depend upon the conditions existing at the location where the sand trap is to be erected.

The conditions at some locations may be such that the projecting ends 9 of the rods 12 will not form a sufficiently firm footing for the posts and if a better footing is required then I may employ the channel iron members 23 which are driven into the sand alongside of the posts and may be bolted thereto by suitable bolts 24. These channel iron members may be driven into the sand for a sufficient depth to afford the desired firm footing for the posts.

In making the sand trap sections 30 I propose to use triangular-shaped frame members 31 which are set at the inner ends of the walls 3, these frame members having feet 32 which are sunk in the ground. These triangular frame members may be connected by rods or bars 33 which may be secured to the triangular-shaped frames 31 in any approved way. 34 indicates wire mesh which is secured to the tie connections 33, preferably on both sides and also underneath of the sand trap section. This sand trap section will thus be substantially triangular in cross section and will be enclosed except for the ends with the wire mesh. Any suitable ballast 36 may be placed within the sand trap section.

When in use the sand trap section tends to gather seaweed and other refuse material and thus form a foundation on which to build up the shore line so that instead of washing out the shore line the latter is built up where my improvements are located.

In Fig. 8 I have shown a way of anchoring the sand trap section in case the place where the sand trap is located does not provide a suitable foundation for anchoring the triangular frames. This construction shows a bank 37 just beyond the beach portion of the shore. I have illustrated some beams 38 which are anchored at one end in the concrete foundation 39 that is sunk in the earth at the top of the bank and said beams are shown as resting on supports 40 near their free ends. The free ends of these anchored beams are connected by steel cables 41 to the sand trap connection 30. Any desired number of these anchoring devices may be employed depending on the requirements.

With this construction it is sometimes desirable to fill the space beneath the cables 41 and the bank with brush, seaweed and like material as shown at 43, and also to secure wire mesh 42 to the cables 41, said mesh enclosing the filling material 43. This construction makes an effective sand trap for accumulating sand and preventing washing away of the bank 37 and it also serves to build up the beach between the bank and the water.

I claim:

1. A sand trap for protecting shore property comprising a wire mesh matting laid on the beach, sill members overlying said wire matting at spaced intervals, each sill member having an eye at its end, posts rising from the ends of the sill members, each post having at its lower end a projection extending through the corresponding eye, tie rods adjustable as to their length connecting at their upper ends the posts at opposite ends of each sill, wire mesh walls located on the inside of the posts, and ballast supported on the wire mesh mat and confined between said walls, the adjustable tie rods providing for adjusting the oppositely situated posts at different angles relative to each other.

2. A sand trap as described in claim 1, in which each post has a rod extending longitudinally therethrough and projecting below the post to form an anchoring portion, the upper end of the rod that projects above the post having a loop to receive the adjustable tie rod.

In testimony whereof, I have signed my name to this specification.

DAVID J. CURNEY.